United States Patent [19]
Smith

[11] Patent Number: 5,224,229
[45] Date of Patent: Jul. 6, 1993

[54] INFANT PROTECTIVE DEVICE FOR USE IN VEHICLES

[76] Inventor: Dale A. Smith, 26 Ormsby Cir., Peru, N.Y. 12972-9200

[21] Appl. No.: 943,679

[22] Filed: Sep. 11, 1992

[51] Int. Cl.$^5$ .............................................. A47D 7/00
[52] U.S. Cl. ................................................ 5/655; 5/94; 297/250; 297/464
[58] Field of Search ................. 5/93.1, 94, 101, 655; 297/250, 464, 465; 280/801; 224/158

[56] References Cited

U.S. PATENT DOCUMENTS

| | | |
|---|---|---|
| 3,003,164 | 10/1961 | Calvelage . |
| 3,269,261 | 8/1966 | Dishart . |
| 3,579,673 | 5/1971 | Hirschey ............................ 297/250 |
| 3,833,946 | 9/1974 | Von Wimmersperg . |
| 3,833,947 | 9/1974 | Sorensen ................................. 5/94 |
| 4,366,587 | 1/1983 | Takada . |
| 4,440,331 | 4/1984 | Schimmels ........................ 297/250 |
| 4,583,253 | 4/1986 | Hall ..................................... 297/250 |
| 4,591,208 | 5/1986 | McDonald ......................... 297/250 |
| 4,717,056 | 1/1988 | Carmichael ........................ 224/158 |
| 4,998,307 | 3/1991 | Cone . |
| 5,002,338 | 3/1991 | Gisser ................................. 297/464 |
| 5,143,420 | 9/1992 | Switlik ............................... 297/250 |

FOREIGN PATENT DOCUMENTS

| | | | |
|---|---|---|---|
| 23007 | 6/1935 | Australia .............................. 5/93.1 |
| 717031 | 2/1942 | Fed. Rep. of Germany .......... 5/101 |
| 2306853 | 11/1976 | France ..................................... 5/94 |
| 10948 | 1/1991 | Japan ................................ 297/465 |

*Primary Examiner*—Peter M. Cuomo
*Assistant Examiner*—Flemming Saether
*Attorney, Agent, or Firm*—Richard C. Litman

[57] ABSTRACT

An infant protective device for use while traveling in a vehicle, such as an airplane, which is designed so that an infant or small child can survive the impact of a crash. The device has a tubular casing with interior surfaces which are lined with resilient material for cushioning. An adult occupant of a vehicle using a seat belt straps the device to his or her seat belt, thus restraining the casing from untoward displacement during a crash.

9 Claims, 2 Drawing Sheets

INFANT PROTECTIVE DEVICE FOR USE IN VEHICLES

BACKGROUND OF THE INVENTION

1. Field of the Invention

This invention relates to an infant protective device for use while traveling in a vehicle, such as an airplane, and, more particularly, to a tubular casing which is used as a safety restraint for an infant or a small child and which is restrained from untoward displacement by interengagement with an adult occupant's seat belt.

2. Description of the Prior Art

Prior attempts have been made at constructing infant restraining devices which prevent injury from the impact of a crash, but few attempts have been directed toward the construction of a safety restraint that can be effectively used in combination with a seat belt of an adult user, nor for use on an airplane or like vehicle, where rapid deceleration can cause critical injuries and fatalities.

U.S. Pat. No. 3,003,164 issued on Oct. 10, 1961 to E. M. Calvelage discloses a safety bed or berth for infants fashioned of flexible materials in which the infant is almost fully contained. This safety bed is intended to be strapped to an automobile seat.

U.S. Pat. No. 3,269,261 issued on Aug. 30, 1966 to Harry S. Dishart discloses a baby cradle-like carrier that is readily converted from a carrier to a cot or bed and readily supported upon a horizontal surface such as a floor or a seat of an automobile.

U.S. Pat. No. 3,833,946 issued on Sep. 10, 1974 to Heinrich F. Von Wimmersperg disclosed a car bed for infants which is adapted to be supported on a vehicle seat and which is designed so as to minimize the danger of serious injury from sudden acceleration or deceleration associated with a collision. The device is mounted within and belted to the seat of an automobile and shifts its orientation upon sudden deceleration or acceleration and thus maintains the baby in place.

U.S. Pat. No. 4,366,587 issued on Jan. 4, 1983 to Juichiro Takada shows an infant safety carrier for vehicles having a bag of strong flexible material dimensioned to envelope an infant's body and head to restrain the infant safely in the event of an accident.

U.S. Pat. No. 4,998,307 issued on Mar. 12, 1991 to Richard E. Cone shows a convertible infant restraint device for securing an infant inside an automobile. It is an improvement on the standard infant car seat in that the infant may be contained in a reclining position parallel to the seat or, alternately, in a rearward facing position. The infant is securely confined in the convertible restraint by straps in either transporting position.

None of the prior patents, either taken singly or in combination, disclose the present invention of a tubular restraining structure providing adequate support of an infant's entire body during rapid deceleration, while being fastened directly to a seat belt already in use by a passenger, preventing the restraint from becoming a loose projectile within an aircraft or like vehicle, during an accident or crash.

SUMMARY OF THE INVENTION

The infant protective device of the present invention is used while traveling in a vehicle such as an airplane. It is designed for use with a vehicle seat, with an adult occupant using the seat, and with the adult being restrained in that seat by a seat belt. The device has an elongated tubular casing provided with a first and second end and has an inner surface defining an inner chamber. The casing contains a bottom wall joining two side walls which, in turn, are connected to a top wall. The top wall has a cut-out adjacent to the first end of the casing. End wall sections on both the first and second ends of the casing have segments of circular caps. There is also an appropriate cut-out for the feet of the infant. Strap means including ends with male/female adjustable couplings are affixed medially across the casing for securing an infant therein. The casing also has a cushion lining to provide a resilient layer to prevent injury during impact as well as flotation. Hand holes are also provided in the end wall sections for carrying. Pliable straps engage the casing and are attachable to the adult occupant's seat belt.

Accordingly, it is an object, advantage and feature of the invention to position an infant within the inner chamber of the casing, having the infant's head aligned with the cut-out, so as to protect the infant from impact involving the vehicle.

It is still a further object, advantage and feature of the invention to provide a casing which enshrouds an infant and is restrained from untoward displacement by engagement between the pliable straps and the adult occupant's seat belt.

It is still a further object, advantage and feature of the invention to provide an infant protective device as described that supports the back, neck, torso, and legs of the infant during rapid deceleration (or acceleration), while affording the advantage of the device not becoming a loose projectile within the vehicle (such as an aircraft cabin).

It is still a further object, advantage and feature of the invention to provide an infant protective device which can easily be used by strapping the device to a conventional seat belt harness used in airplanes and other vehicles.

It is still another object, advantage and feature of the invention to provide an infant protective device that can easily be implemented, without expensive modifications to airplanes or other vehicles so that the device can be used by large numbers of individuals on an as needed basis.

It is still another object, advantage and feature of the invention to provide an infant protective device that can be used in a vehicle such as an airplane whereby an infant and an adult passenger share the same seat, while both are adequately protected from injury associated with a crash or collision.

These and other objects, advantages and features of the present invention will become apparent from the following drawing, description and claims.

BRIEF DESCRIPTION OF THE DRAWINGS

Like numerals refer to like components throughout the following description.

DETAILED DESCRIPTION OF THE PREFERRED EMBODIMENT

Figure 1:
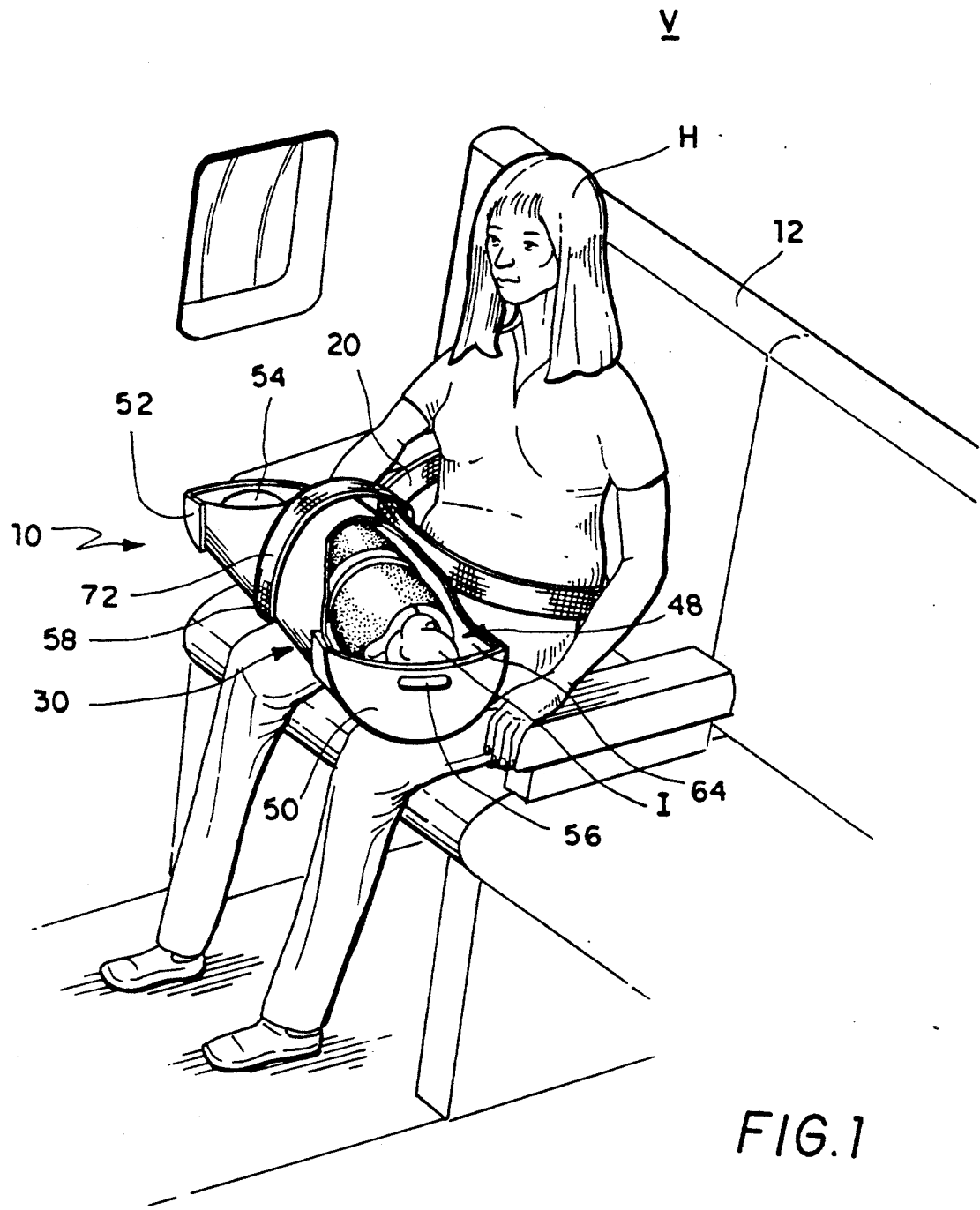
FIG. 1 is an environmental view showing the invention in use by an infant, said invention being secured to the seat belt of an adult occupant of a vehicle.
Figure 2:
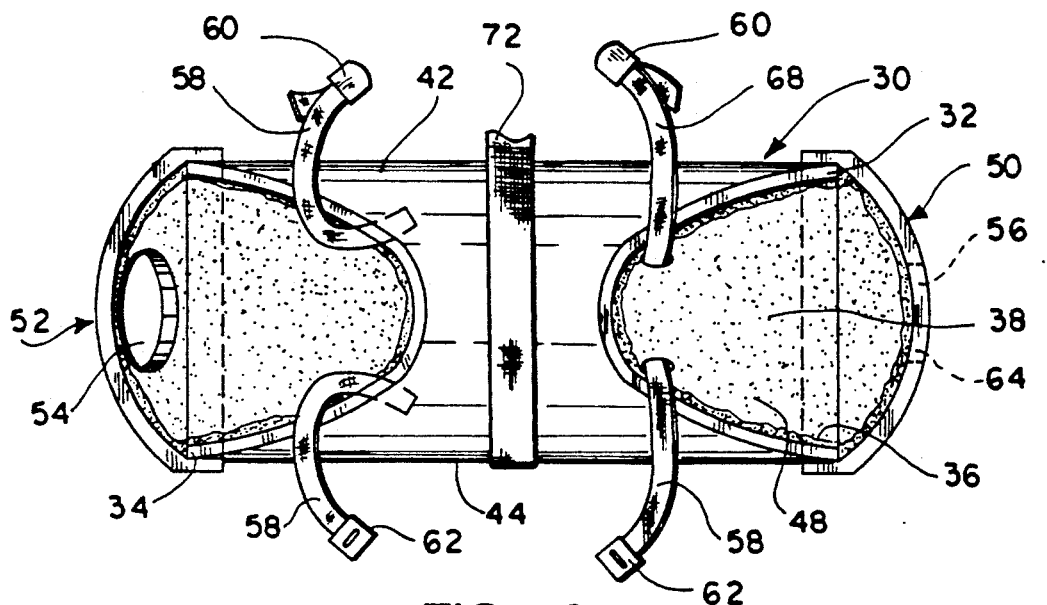
FIG. 2 is a top view of the invention.
Figure 3:
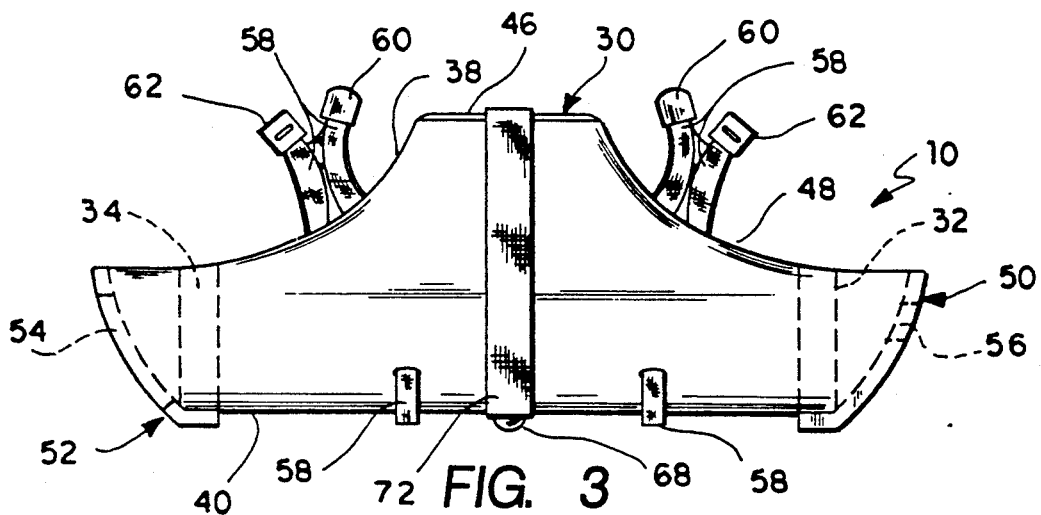
FIG. 3 is a side view of the invention.
Figure 4:
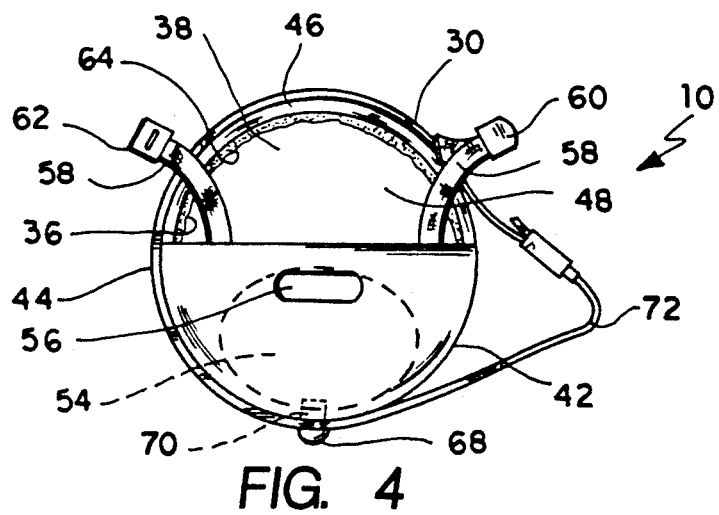
FIG. 4 is an end view of the invention.

Referring now to the drawings, infant protective device 10 is shown for use by an infant I or small child while traveling in a vehicle V such as an airplane, the vehicle V having a seat 12 and adult occupant H using a seat belt 20 therein. Device 10 has an elongated tubular casing 30 provided with first end 32 and second end 34 and has an inner surface 36 which defines an inner chamber 38. Casing 30 includes a bottom wall 40 joined to two side walls 42 and 44, and, in turn, is connected to a top wall 46. Casing top wall 46 has a cut-out 48 adjacent to said casing first end 32. The casing has a first end wall section 50 and a second end wall section 52 which are segments of circular caps. Second end 52 has a cut-out 54 for a foot hole for the feet of the infant I which is also an expanded hand hole. Hand hole 56 is also provided in end wall section 50. Adjustable straps 58 are affixed medially across casing 30 and each has a male end 60 and female end 62 which are coupled together to secure infant I within casing 30. Casing 30 also has a layer of impact resistant and buoyant material 64 which provides a cushion lining for casing 30. Flexible straps 72 engage casing 30 and attach casing 30 to seat belt 20 of an adult occupant H.

Infant I is positioned within casing inner chamber 38, having his or her head aligned with cut-out 48. The infant I is protected from the impact of a crash or collision involving vehicle V in that casing 30 enshrouds infant I and is restrained from untoward displacement within the casing 30 by pliable straps 58 and the casing 30 is restrained by the engagement between the strap 72 and seat belt 20 used by adult occupant H.

In the preferred embodiment, inner chamber 38 has a ten inch inside diameter and is fabricated of polyvinylchloride pipe or equivalent material. Cushion lining 64 is one half inch sponge foam with two one half inch (½) by two (2) inch longitudinal polystyrene strips running the inner length of the sides 42,44, providing positive flotation in a marine environment. Strap 72 is a two inch wide webbed, conventional "seat belt" strap which is bolted to casing 30 by a five sixteenth (5/16) inch stove bolt 68 and corresponding block nut 70. Straps 58 are passed through strap holes 52 in casing 30, securing straps 58 to casing 30 to provide effective restraint of infant I within casing 30.

Device 10 can be constructed having different dimensions than those of the preferred embodiment. For example, it can be shorter and have a twelve inch diameter casing 30 and still fit in the lap of adult occupant H. The preferred embodiment is depicted for use with a child of average growth, being approximately thirteen to fourteen months old. However, the invention is intended to include a restraining device 10 which can be constructed in varying sizes to accommodate infants I and older children of various heights and weights.

Accordingly, the preferred embodiment of the invention is in no way considered to limit the invention, as all variations are to be considered within the scope of the claims appended hereto.

What is claimed is:

1. An infant protective device for use while travelling in a vehicle, the vehicle having a seat and a seat belt and an adult occupant using the seat and being strapped thereto by the seat belt, said infant protective device comprising:

an elongated tubular casing provided with a first and second ends and having an inner surface defining an inner chamber, said casing including a bottom wall joined to two side walls in turn connected to a top wall, said casing top wall having a cut-out adjacent said casing first end, an end wall section on said casing at both first and second ends, said first and second ends including segments of circular caps, and pliable strap means engaging said casing and attachable to the adult occupant's seat belt whereby, with an infant positioned within said casing inner chamber and having its head contiguous with said cut-out, the infant is offered protection upon an impact involving the vehicle as said casing enshrouds the infant and is restrained from untoward displacement by engagement between said pliable strap means and adult occupant's seat belt.

2. An infant protective device according to claim 1, wherein said casing has a circular cross-section.

3. An infant protective device according to claim 1, wherein said end wall section of said second end of said casing has a cut-out for the feet of the infant should the infant be of a height which exceeds a length of said casing.

4. An infant protective device according to claim 1, wherein said casing further includes adjustable strap means affixed medially therein for securing the infant.

5. An infant protective device according to claim 4, wherein said adjustable strap means further includes strap ends having adjustable coupling means.

6. An infant protective device according to claim 5, wherein said adjustable coupling means comprise a male member and a female member engagable with each other for securing the infant within the casing.

7. An infant protective device according to claim 1, wherein said casing has a cushion lining.

8. The infant protective device according to claim 7, wherein a portion of said cushion lining shall provide buoyancy to prevent said casing and the infant therein from submerging in a marine environment.

9. An infant protective device according to claim 1, wherein said end wall sections have handholds for carrying said infant protective device.

* * * * *